(12) United States Patent
Beck et al.

(10) Patent No.: US 10,719,941 B1
(45) Date of Patent: Jul. 21, 2020

(54) AERIAL DEVICE INCLUDING TRANSLATION OR ROTATION MEASUREMENT

(71) Applicant: Altec Industries, Inc., Birmingham, AL (US)

(72) Inventors: Aaron Beck, Kansas City, MO (US); Michael A. Fleming, Kansas City, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/725,356

(22) Filed: Dec. 23, 2019

(51) Int. Cl.
| | |
|---|---|
| A61B 5/00 | (2006.01) |
| G06T 7/20 | (2017.01) |
| G05D 3/20 | (2006.01) |
| B66F 17/00 | (2006.01) |
| H04N 5/225 | (2006.01) |
| G06T 7/70 | (2017.01) |
| G06F 3/00 | (2006.01) |
| B66F 11/04 | (2006.01) |

(52) U.S. Cl.
CPC .............. *G06T 7/20* (2013.01); *B66F 17/006* (2013.01); *G05D 3/20* (2013.01); *G06T 7/70* (2017.01); *H04N 5/2253* (2013.01); *H04N 5/2256* (2013.01); *B66F 11/046* (2013.01)

(58) Field of Classification Search
CPC .................................. G06F 3/00; A61B 5/00
USPC ......................................................... 382/103
See application file for complete search history.

(56) References Cited

U.S. PATENT DOCUMENTS

| | | | |
|---|---|---|---|
| 6,741,335 B2 * | 5/2004 | Kinrot .................... | G01D 5/347 345/166 |
| 7,400,950 B2 | 7/2008 | Reich | |
| 10,427,926 B2 * | 10/2019 | Mourlam ................. | B60Q 9/00 |

* cited by examiner

*Primary Examiner* — Abolfazl Tabatabai
(74) *Attorney, Agent, or Firm* — Erise IP, P.A.

(57) ABSTRACT

Disclosed is a system which uses one or more camera units with embedded processors to measure the relative translation and/or rotation between different members on an aerial device. Image data from each unit is processed and transmitted processing to the position control system of the aerial device, and used to determine the position of an aerial element of the device.

20 Claims, 12 Drawing Sheets

AERIAL DEVICE INCLUDING TRANSLATION OR ROTATION MEASUREMENT

RELATED APPLICATIONS

None.

BACKGROUND

1. Field

Embodiments of this disclosure relate generally to position monitoring. More specifically, embodiments of this disclosure relate to systems for measuring translation and/or rotation of connected components on an aerial device.

2. Related Art

Boom systems, sometimes located on a vehicle, e.g., a truck, are typically used to aerially position loads, e.g., workers, equipment, etc. The truck normally serves as a base above which rigid connected sections are both rotated or translated relative to one another to establish a position for a load-bearing end of the boom.

Many conventional boom systems utilize string potentiometers or draw wires to measure boom extension. More specifically, these systems involve attaching a spring loaded spool of cable to a stationary location and attaching the end of the cable to the moved segment.

In terms of turret rotation, it is known to use single-point proximity switches located at various positions about a rotating member. This technique, however, produces discontinuous readings.

It is also known to use a rotation encoder to measure relative angles of rotating members. This technique can be challenging to implement in designs which require components to be located in or through the center of the rotational joint in order to function.

Some position determining arrangements utilize bar codes which are sensed when particular translational or rotational positions are reached.

SUMMARY

Embodiments of this Disclosure

Disclosed is a position detection system for a boom truck. In embodiments, the system includes first and second members that move relative to one another, and a motion-sensing device is included on one or the other. The motion-sensing device is oriented to receive image data relevant to the motion of the one member relative to the other. The system can also include a processer configured to determine a position of the monitored member using the image data.

In embodiments, the first member is translatable relative to the second member, and the processing component determines an extent of translation. The first member can be in a telescopic relationship with the second member. In some embodiments, the first member is translated in and out of the second member, the second member acts as a sleeve for the first member. Optionally, the motion-sensing device can be located in a coaxial space existing between the first and second members, and measure relative movement between the first and second members. In some embodiments, the motion-sensing device is located at a sleeve end of the second member and aimed to obtain image data relating to the translation of the first member in and out of the second member.

The motion-sensing device, in some embodiments, is a camera having a lens configured to have a focal length that contemplates a distance from the camera to a surface to be imaged. In some embodiments, the camera captures images at a cadence and then processes the images on an embedded processor to determine a distance the first member has translated relative to the second member. Optionally, a light-emitting device is configured to direct light into the area of the surface to be imaged.

In addition to the translational embodiments, other embodiments exist where the measurements are taken of rotation. More specifically, in some the first member is rotatable relative to the second member, and the processing component is configured to determine an extent of rotation. In some embodiments, the first member rotates inside of the second member.

Three embodiments for rotational kinds or systems are disclosed. In a first rotational embodiment, the motion-sensing device is: (i) in a fixed relationship and rotates with the first member, and (ii) oriented to receive images from internal surfaces of the second member. Optionally, the motion-sensing device can include a camera, and the camera is suspended down from the first member such that it is oriented to receive images from the internal surfaces of the second member. The camera has a lens that has a focal length corresponding to the distance from the camera to the internal surfaces of the second member.

In a second rotational embodiment, the motion-sensing device is mounted in fixed relation to the second member and aimed in a direction to receive images from a rotating surface of the first member. Here, the motion-sensing device includes a camera with lens, and the lens has a focal length corresponding to the distance from the camera to a rotating surface of the second member.

In a third rotational embodiment, the motion-sensing device is: (i) in a fixed relationship and rotates with the first member, and (ii) oriented to receive images from a stationary surface a substantial distance from the first member. Here, the motion-sensing device can optionally be a camera, and the camera: (i) is in a fixed relationship and rotates with the first member, (ii) is oriented to receive images from a stationary surface a substantial distance from the first member, and (iii) includes a lens having a focal length which is substantially the same as the distance from the first member. The camera, in embodiments, captures images at a cadence and then processes the images using an embedded processor to calculate arcuate distance traveled to determine rotational movement.

In other embodiments, a movement monitoring system for an aerial device is disclosed. This system includes a first member movable relative to a second member, a camera unit mounted on either the first or the second member, and the camera unit is oriented to receive image data relevant to motion of the first member relative to the second member, and, a communications device is provided which is configured to receive the image data from the camera unit, and send the data to a positioning system for the aerial device.

In yet other embodiments, a system is disclosed where a first image receiving and processing unit is located on a first member, and the unit is configured to measure the relative translation between the first member and a second member on an aerial device. Additionally, a second image receiving and processing unit configured to measure rotation of a rotatable element on the device. In this embodiment, each of the first and second image receiving and processing units are configured to communicate image data to a position control system that is adapted to determine a position of an element of the aerial device using the image data.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 1:
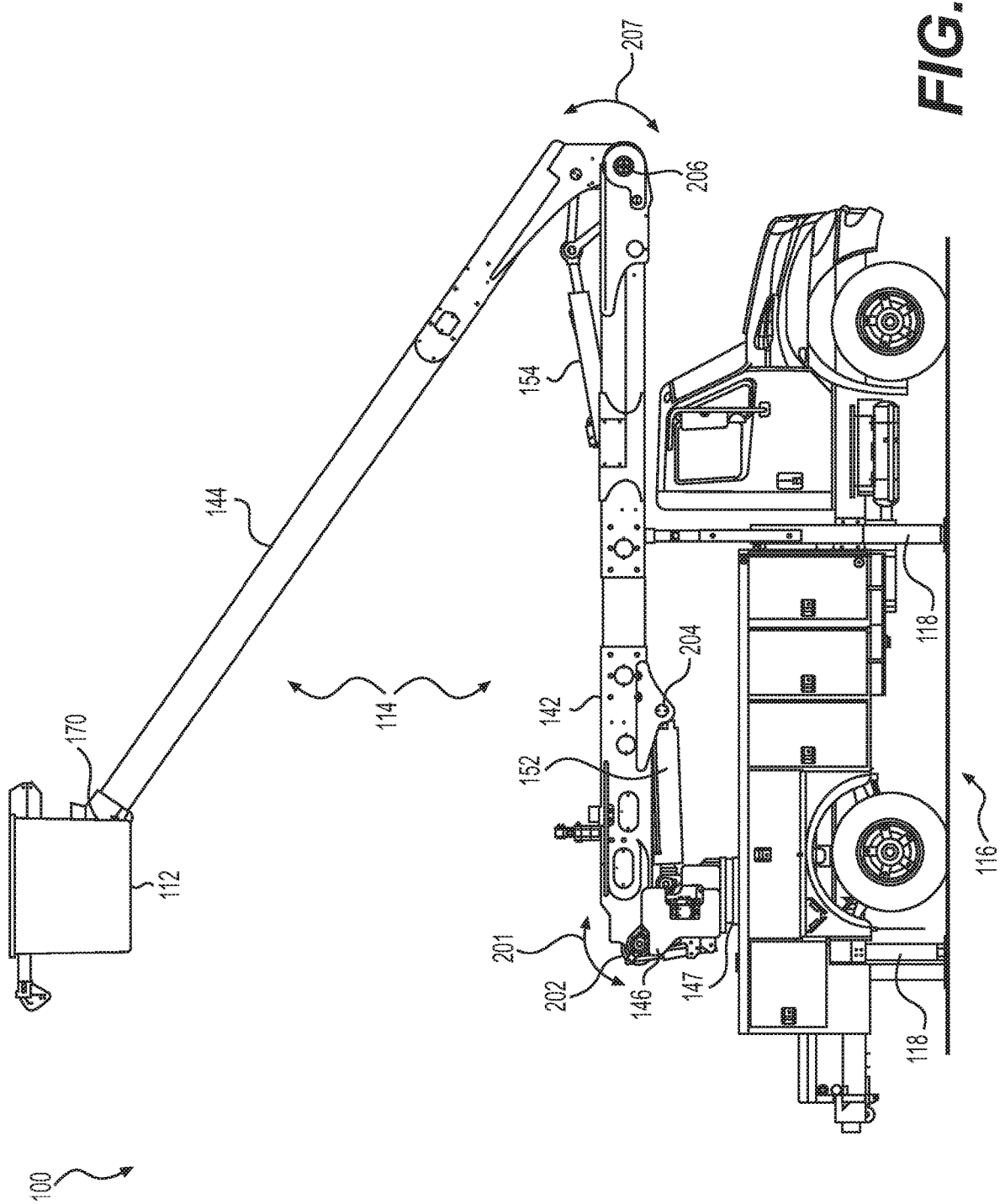
FIG. 1 shows a side view of a boom truck into which the translational and rotational measurement systems for an embodiment might be incorporated.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

At a high level, one or more devices are used to measure translational movement, rotation, or both using one or more optical cameras. In embodiments, the camera captures images at a cadence, these images are continually communicated to a processing unit. The camera lens arrangement contemplates the choice of focal length and of pixel density to match the environment in which it is being used. The image data received over time is used to calculate a value for translation or rotation. The processing chip keeps a record of motion and can transmit reports relevant to movement either continually or upon request.

The system allows for the measurement of parameters like component extension, or unit rotation without significantly altering the structures being measured. This is useful when retrofitting systems to existing units, or in adding functionality to machine structures that are already manufactured and have been used.

FIG. 1 shows a boom truck 100. Those skilled in the art will recognize that a boom truck is an aerial device used to access elevated objects or otherwise difficult to reach items. Those skilled in the art will also recognize that the soon-to-be discussed technologies could also be incorporated into numerous other vehicles, stationary platforms, or other arrangements in which the measurement of translational and/or rotational repositioning is desired. The system 100 includes a boom 114 which may be used to lift and move or suspend an object. A platform 112 is, in the disclosed embodiment, mechanically coupled to a distal end of the member boom 114. The platform 112 may be used to attach one or more objects, and the platform 112 may also be configured to support one or more operators (e.g., in a utility bucket).

The platform 112 is mechanically coupled to a base 116, which may be a stationary or mobile support. In certain embodiments, the base 116 is a fixed structure such as a crane or an oilrig, or a mobile base such as an earth-working machine or a utility truck (e.g., see FIGS. 1 and 2). The base 116 is mechanically coupled to a first end of the boom 114, and the platform 112 is mechanically coupled to a second end of the boom 114, opposite the first end. In other words, the first end of the boom 114 may be described as a proximal end (e.g., proximal to the base 116), and the second end may be described as a distal end.

Extension of the boom 114 may be by one or more hydraulic cylinders mechanically coupled to segments of the boom 114. In certain embodiments, the boom 114 includes an optional lower boom 142 and an optional upper boom 144, which are used for extending the reach of the platform 112 for accessing difficult to reach locations. In embodiments, upper boom 144 is a tubular member, and a translatable member 145 is coaxially included within the boom member 144 (see FIG. 2) thus creating a telescopic arrangement where member 145 telescopes in and out of sleeve 144.

However, the boom 114 may include a fewer or a greater number of segments without departing from the scope hereof.

Lower boom 142 may be pivoted upwardly with respect to a turret 146 via a lower boom hydraulic cylinder connected at a point 204, the cylinder being a mechanical actuator that uses pressurized hydraulic fluid. Turret 146 rotates atop a hollow vertical cylindrical support 147 (also known as a "pedestal") in a substantially horizontal plane creating a first degree of rotation. Rotation in this direction will be measured as will be discussed hereinafter. The hollow cylindrical support 147 includes an access aperture 153, exposing access to wiring, mechanical linkages, and other equipment inside the support 147.

A second direction of rotation 201 exists about a pivot point 202 existing between the turret 146 and lower boom 142. Lower boom 142 rotatably supports upper boom 144 about a pivot axis 206 providing a direction of rotation 207 in a plane shared by members 142 and 144. An upper boom hydraulic cylinder 154 is a mechanical actuator using pressurized hydraulic fluid that extends to raise the upper boom 144, and retracts to lower the upper boom 144, with respect to the lower boom 142 (see FIGS. 1 and 2). In other words, the upper boom hydraulic cylinder 154 is configured to pivotally raise and lower the upper boom 144 with respect to the lower boom 142 about axis 206. Translatable member 145 is moved in and out of the outer sleeve 144 in directions 208.

Figure 2:
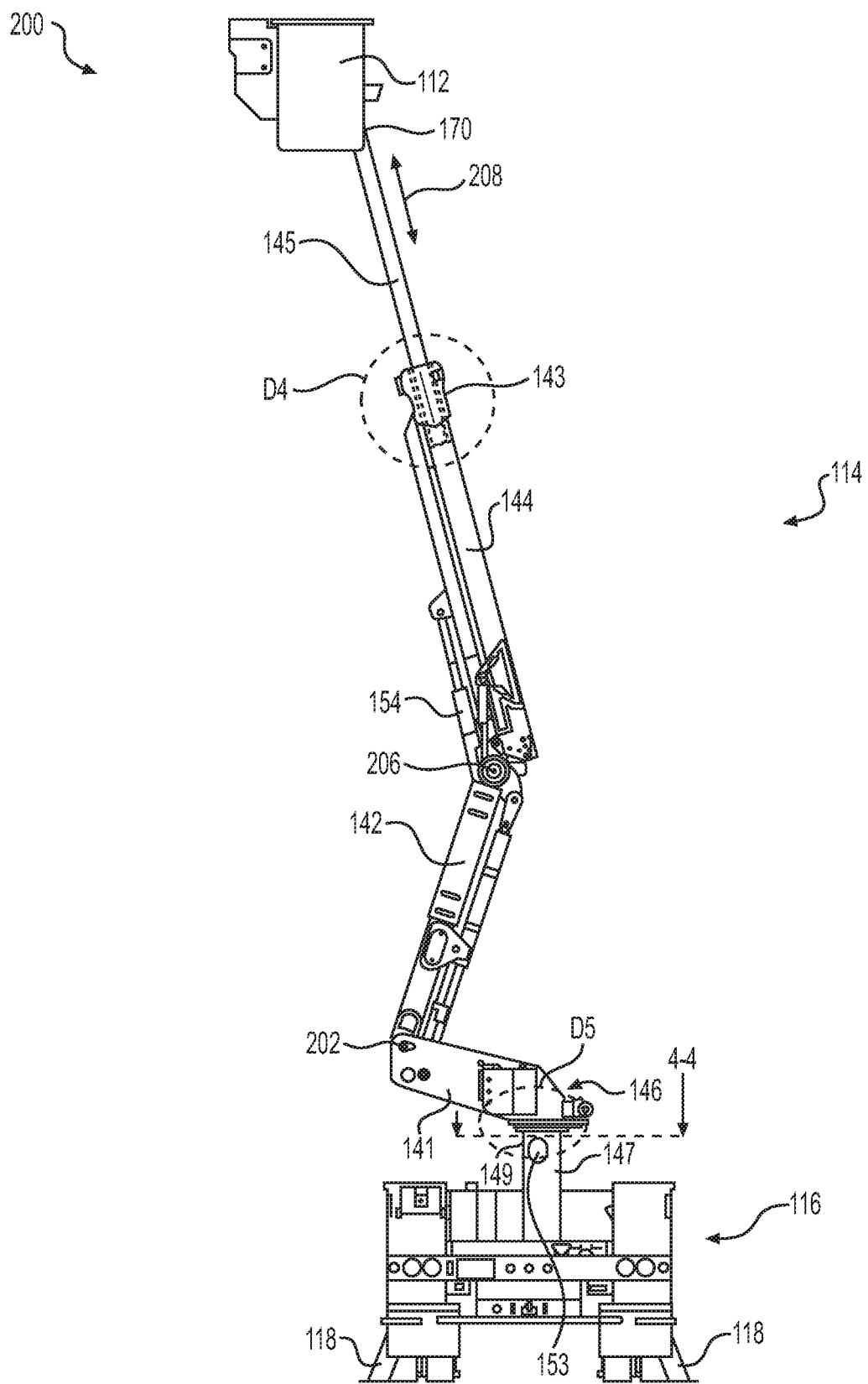
FIG. 2 shows a rear view of a boom truck, where a rotation and an extension have occurred.

In the rear view of the truck shown in FIG. 2, it can be seen that a rotation and an extension have occurred and thus, the platform 112 is in a relatively elevated position due in part to the translation of member 145 outward from sleeve 144.

Figure 3:
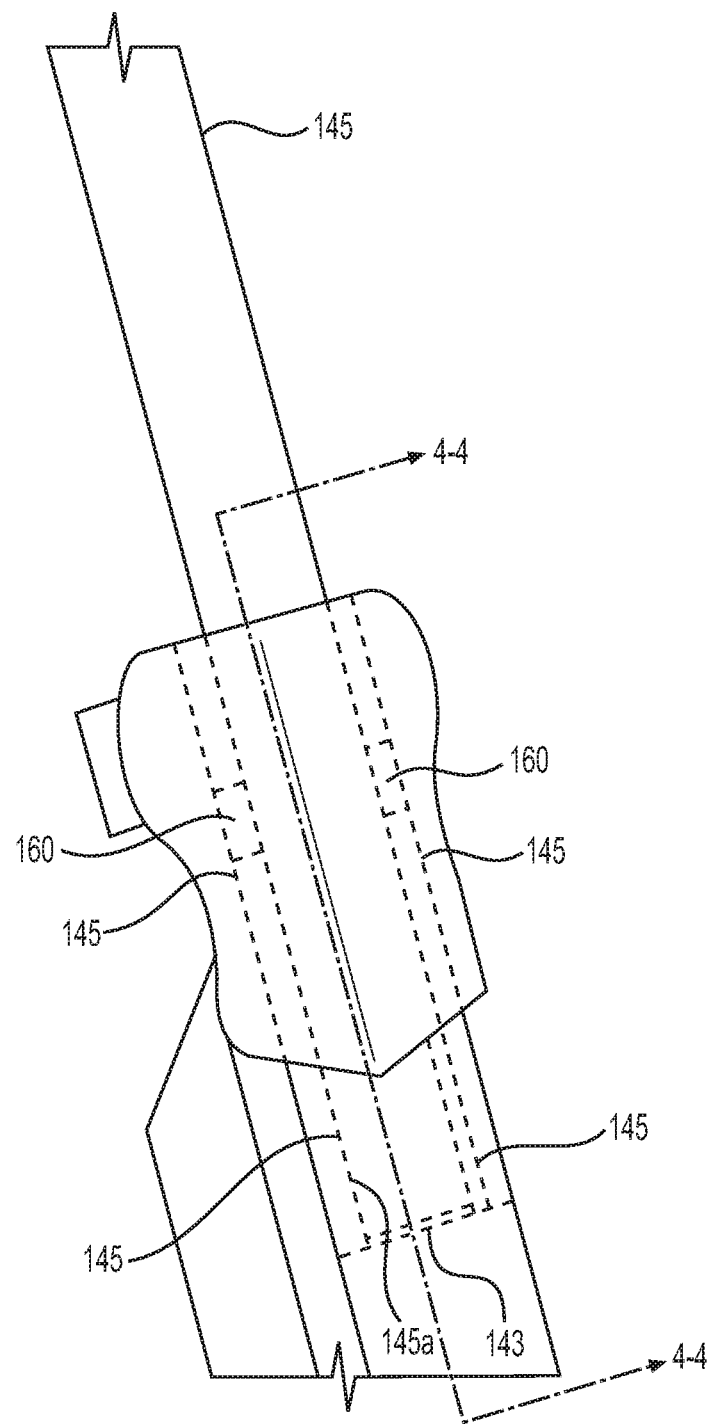
FIG. 3 shows a partial view of detail D3 shown in FIG. 2.

The partial detailed view of FIG. 3 (taken from FIG. 2) shows an internal arrangement as it exists underneath a joint cover. As can be seen in the figure, an end of the member 145 is contained in the sleeve 144. Because of a centering member, the outer surfaces of the inner member 145 are spaced apart from the internal surfaces of the sleeve. Thus, an annular space is created between the two, both being coaxially located relative to the other.

Figure 4:
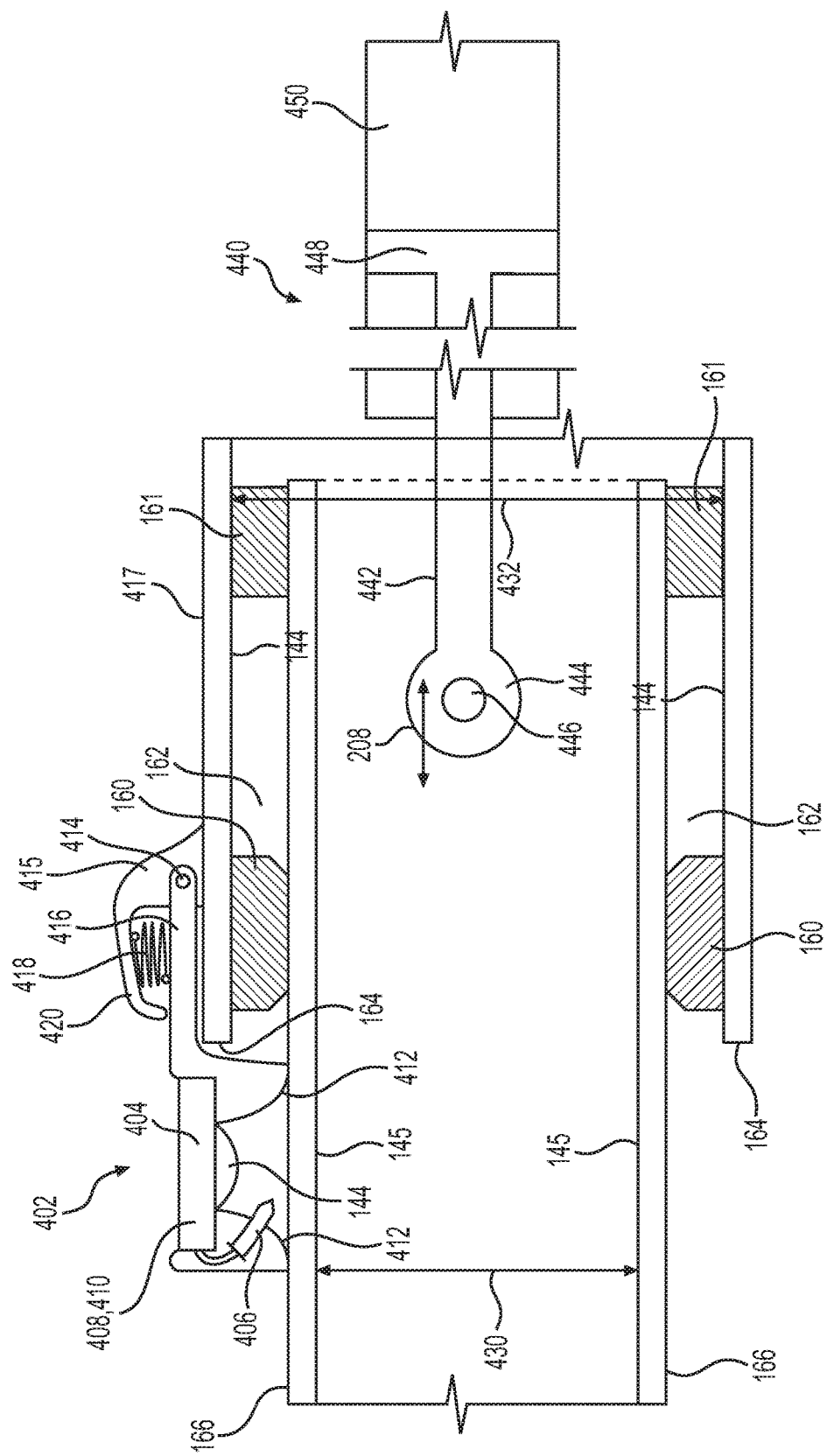
FIG. 4 shows a section 4-4 taken in the detail of FIG. 3 revealing translational measurement equipment in an embodiment.

FIG. 4, which is taken from a section 4-4 taken in the detail of FIG. 3, reveals equipment which has been incorporated into the FIG. 3 equipment for the purpose of measuring translational movement of the inner member 145 relative to the outer sleeve 144. It should be noted that the drawings are not to scale, and it should be further noted that distances 430 and 432 would be greater than shown. As can be seen, a forward slide-pad member 160 along with a back slide-pad member 161 together create a spaced-apart relationship (space 162) between the inner and outer members 145 and 144, enabling sliding of the inner member 145 in and out of the outer member 144. The back slide-pad member 161 exists proximate an outer end 164 of the sleeve 144. Also shown is a pneumatic cylinder arrangement 440 includes a drive rod 442 terminating at a frond end 444. Front end 444 is substantially cylindrical, and expands laterally (which would be in and out of the page as shown in FIG. 4). Pins 446 on each end of the front end 444 are received into complementary apertures (not shown) made through the walls of the inner member 145. A plunger head 448 receives pressure from fluid contained in a cylindrical space 450 to drive the inner member 145 in and out. Those skilled in the art will recognize that numerous other actuator arrangements could be used alternatively to the one shown.

Further evident in the figure is that a translational measurement device 402 has been located where end 164 overhangs the outer surface 166 of the inner member 145. Device 402 includes a camera 404, an emitter 406, a processing component 408 (which in embodiments is an embedded processor as shown, but could be located remotely), and a communications component 410.

The camera 404 is selected such that it includes a lens arrangement creating a focal length corresponding to the distance from which readings will be taken. In the FIG. 4 embodiment, the distance from the camera 404 to the outside surface 166 of the inner member 145 is small. Thus, a focal length for the lens included in camera 404 will, accordingly, be relatively small. Looking again to FIG. 4, it can be seen that a downwardly-extending protruding ring 412 engages the outer surface 166 of the inner member 145, and these components have been sized such that they establish the proper focal length by determining a distance at which the lens of camera 404 is maintained.

The light emitter 406, in the disclosed embodiment of FIG. 4, is an encapsulated LED which is designed to illuminate surface 166 where necessary due to lighting conditions. For different embodiments, the LED emitter 406 will not be necessary. In the FIG. 4 embodiment, the LED has been angled to illuminate into the area of the surface 166 being viewed by the camera 404.

Figure 11:
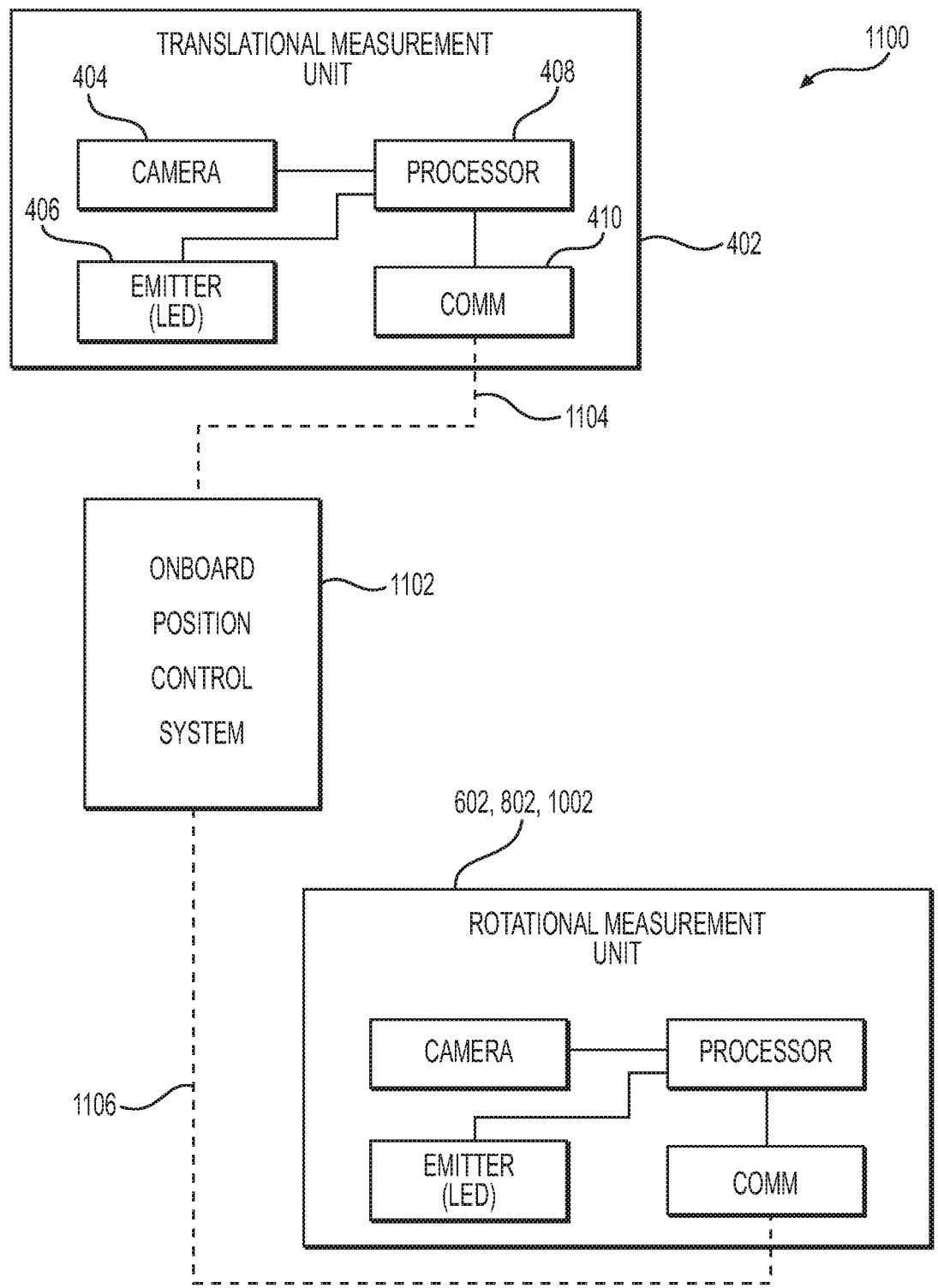
FIG. 11 shows a system block diagram for an embodiment including both translational and rotational measurement arrangements.

In the FIG. 4 embodiment, the processing component 408 is embedded in a chip along with a communications component 410 (see also FIG. 11). In embodiments, the communications component incorporates known technologies and enables wireless communications with an onboard position control system on the vehicle (e.g., included in the onboard computer in the boom truck). This enables the translation measurement unit 402 to be easily retrofit into an already-manufactured piece of equipment. In other embodiments, the communications component 410 is wired (wired arrangement not shown) to the onboard computer system/position control unit.

Mechanically, a biased-lever arrangement ensures that contact between the measurement unit 402 and an outside surface 166 of internal member 145 is maintained at all times as the inner member 145 is translated in and out of the outer member (sleeve) 144. This is accomplished by providing a pin hinge 414 internally of an upwardly-outcropped body 415 mounted on top of the external surface 417 of the sleeve 144. A compression spring 418 is contained underneath an overhang 420 which extends out from the body 415. The compression spring 418 biases the measurement unit 402 in a counter-clockwise direction (see FIG. 4), resulting in the downwardly-extending ring 412 to remain in engagement with the surface 166 upon any translation, while at the same time maintaining the camera at focal length to maintain accurate readings. Those skilled in the art will recognize that numerous other alternative arrangements could be substituted for the one shown in FIG. 4 and still fall within the broad aspects of what is disclosed. For example, the measurement unit 402 could simply be fixed to the outer surface 417 or end of the sleeve 144 such that camera 404 is over and receives images from the outer surface 166 of inner member 145.

Figure 5:
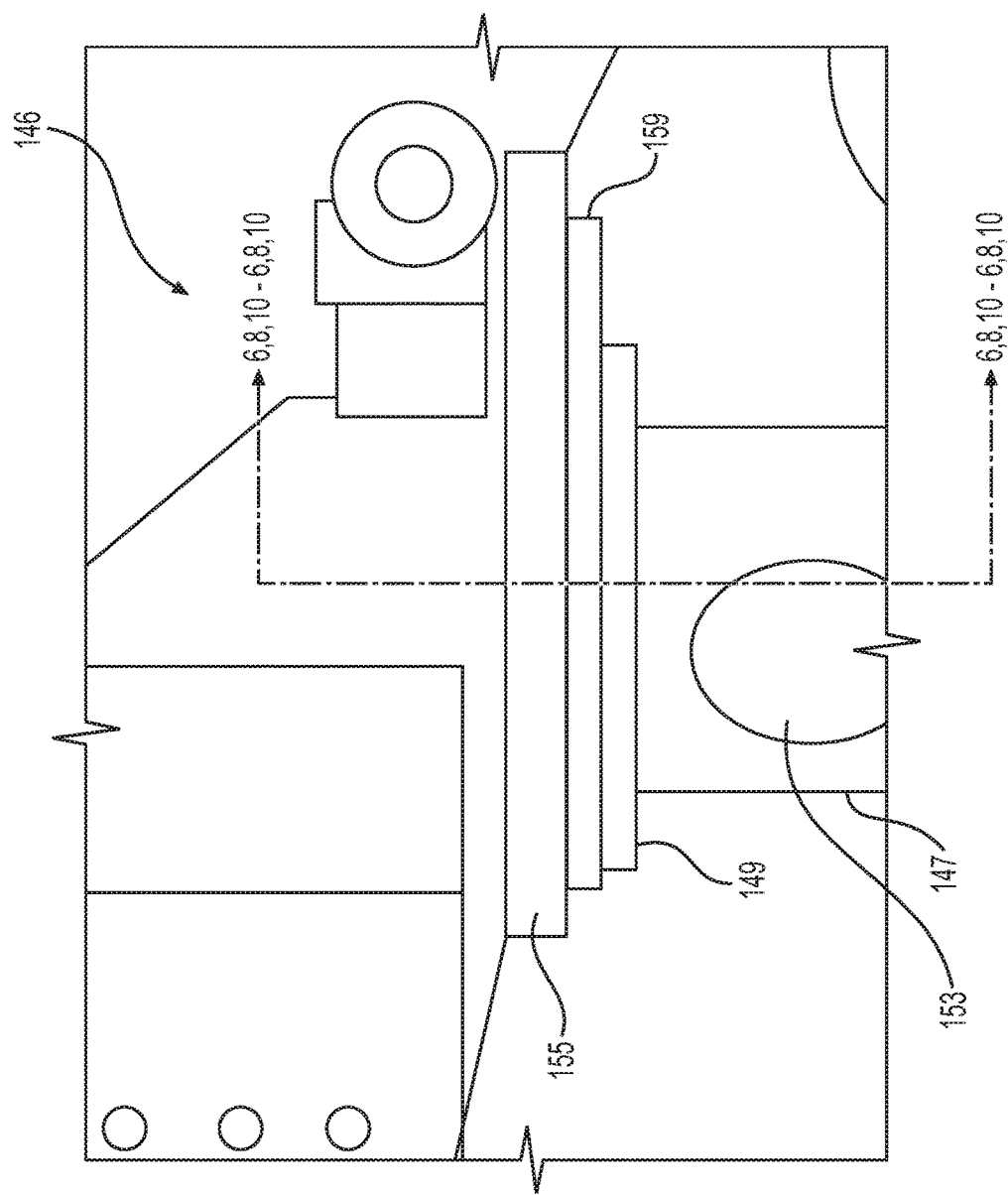
FIG. 5 shows a partial view of detail D5 shown in FIG. 2.

Details regarding the optional incorporation of a system for measuring rotation is disclosed. FIG. 5 shows a partial view of detail D5 shown in FIG. 2 which reveals a location at which a rotational movement unit can be installed. In the figure, details regarding the turret interface are shown. More specifically, it can be seen that a flange 149 atop the vertical cylinder 147 supports a roller-bearing arrangement which is supported from below by a flange 149, and stacked underneath a portion of the turret 155.

Figure 6:
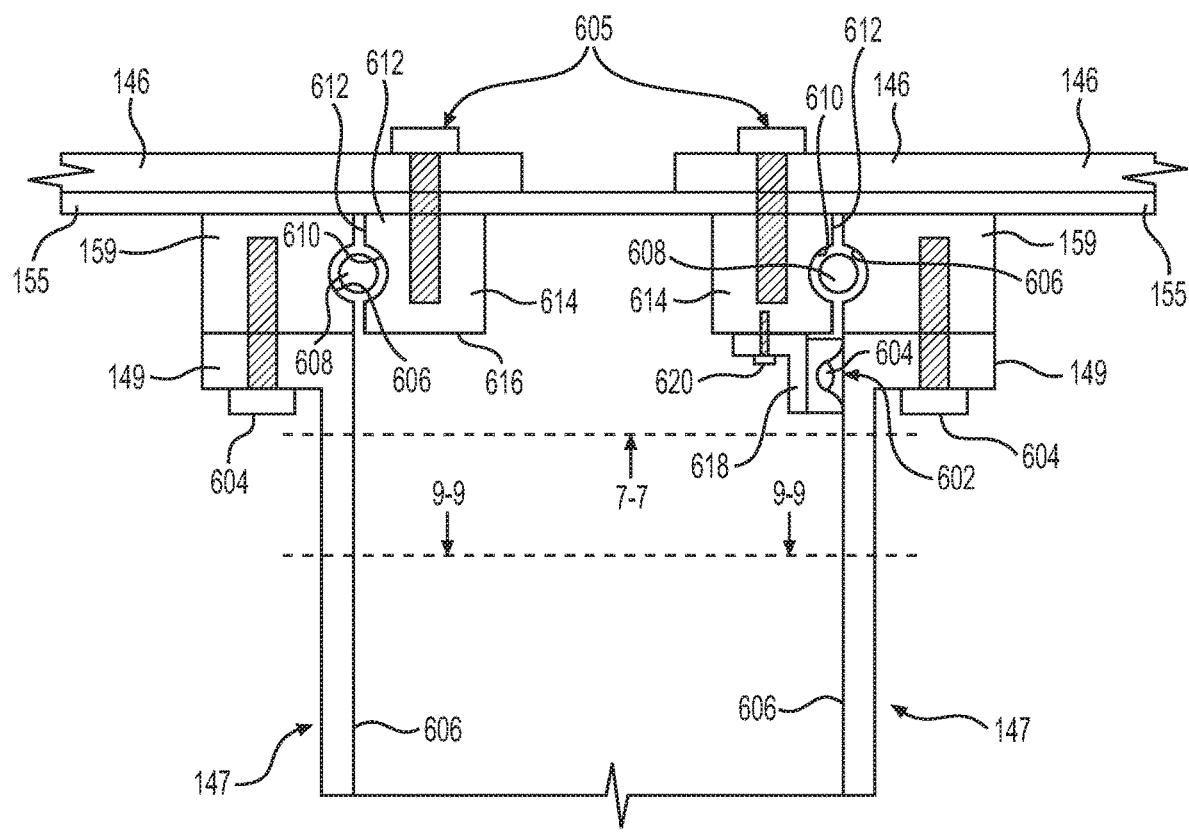
FIG. 6 shows a sectional view 6-6 taken in FIG. 5 revealing a first exemplary embodiment for a rotational measurement equipment arrangement which can be incorporated into a boom truck or other aerial positioning system.

The embodiments disclosed in FIGS. 6-10 reveal various arrangements for measuring rotational movement. For example, FIG. 6 shows a sectional view 6-6 taken in FIG. 5 revealing an exemplary environment in which a need to measure rotational displacement might exist. In the FIG. 5 embodiment, rotation exists at the interface between the outside bearing race member 159 (which is in fixed relation relative to the cylinder 147) and the inside bearing race cover 614 (which is in fixed relation relative to the turret 146, and thus, the aerial system. A flange 149 is shown at the top of the cylinder 147 receives fasteners 604 to secure bearing race member 159. Member 159 is internally grooved to create an outside bearing race track 606 for a bearing set 608. The bearings 608, from the inside, are received into a reciprocating external groove defined into the cylindrical surface 612 of internal cylindrical member 614, thus creating an internal race track 610. The internal and external tracks 610 and 606 contain the bearings. This arrangement enables the internal race member 614 to freely rotate inside the outer member 159. It is this freedom to rotate in a plane substantially atop and perpendicular to the stationary support cylinder 147 that enables the pivoting of plates 155 integral with and supporting turret 146, the plates 155 being secured to the rotating inner member 614 by bolts 605.

The measurement of the rotation of the turret (or other rotating features of the aerial support structures) can be taken by an optical measurement device 602, which is much like the optical device 402 already discussed in regard to the translational embodiment of FIG. 4. Again here, device 602 includes a camera, an optional emitter (not shown), an embedded processing component, and a communications component enabling one of hard wired or wireless capabilities.

Referring to FIG. 6, it can be seen that device 602 is mounted on an undersurface 616 of the rotatable inside race member 614 using an L-bracket 618 fixed using one or more fasteners 620. The mounting arrangement ensures that the camera is facing outward at the stationary internal cylindrical wall 606. Thus, when the turret 146 rotates, the internal cylindrical member 614 rotates along with it, and during the motion, the camera captures images of the internal wall 606 at a cadence. The images are continually received by the processing unit associated to determine the rotation which has occurred based on a circumferential distance-traveled measurement being converted into an angular position of displacement. More specifically, the detected distance traveled by the device 602 can be converted into an angular displacement Ø (in radians) using the arc length L (read distance traveled during a rotation) and the radius (r) according to the formula Ø=L/r.

There will be some clearance provided between the rim of the camera such that there is no interference with the inner cylindrical surface 606 when rotation occurs. The camera 604 associated with measurement device 602 is selected such that it includes a lens arrangement creating a focal length corresponding to the distance to an internal surface 606 of the cylindrical member 147. Here, the distance from the camera 604 to the internal surface 606 of the inner member 145 is relatively small. Thus, camera lens arrangement 604 will be selected such that it has a relatively small focal length.

Figure 7:
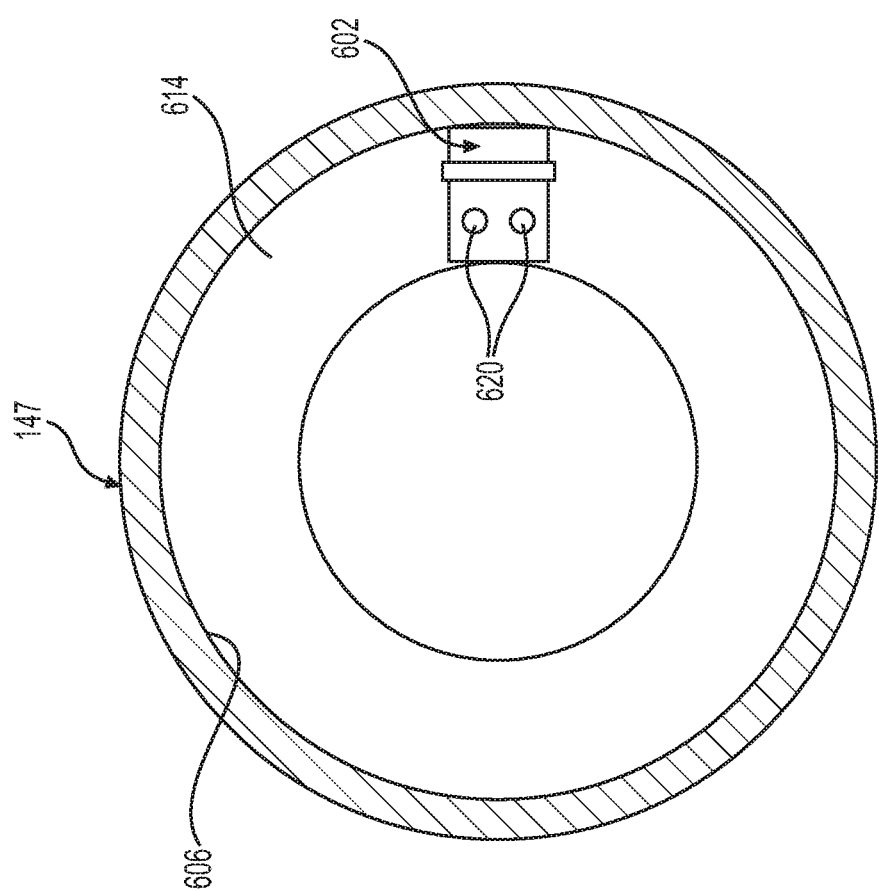
FIG. 7 shows a sectional view 7-7 taken as shown in FIG. 6.

FIG. 7 shows view 7-7 taken as shown in FIG. 6 which reveals rotational measurement device 602 as it appears from a view looking up from inside cylinder 147, and from below.

Figure 8:
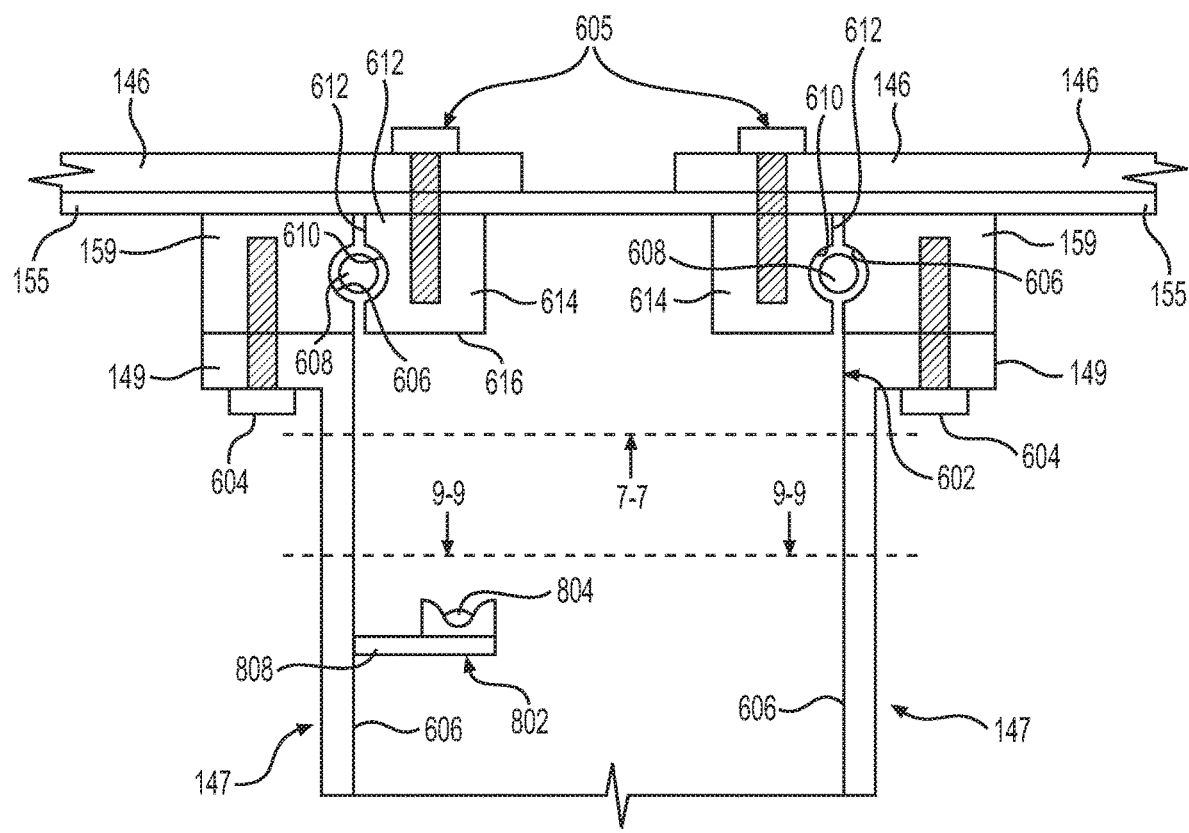
FIG. 8 shows a sectional view 8-8 taken in FIG. 5 revealing a second exemplary embodiment for a rotational measurement equipment arrangement.

The sectional view 8-8 taken in FIG. 5 and shown in FIG. 8 reveals an alternative second exemplary embodiment for the measurement of rotation of the turret. In this equipment arrangement, an upwardly-facing rotation measuring unit 802 including a camera 804 is mounted atop two supports 808 (See FIG. 9), each extending out from the internal cylindrical wall 606 and supporting the unit 802 from below. Camera 804, in the FIG. 4 embodiment, faces up inside the cylinder 147 and is directed towards, and focuses on an undersurface 616 of internal cylindrical member 614. Alternatively, the camera 804 could be focused on the undersurfaces of members 155 or 146 or other relatively-rotating parts different embodiments. Again, the extent of rotation of member 614 is the same as for the turret 146.

Unlike with the embodiment disclosed in FIG. 6 where the unit 602 was in rotation and measured the circular path traveled relative to the internal cylinder wall 606, the FIG. 8 unit 802—including a camera 804, LED emitter 806 (shown in FIG. 9) and mounted on support structures 808—is stationary relative to the cylindrical support 147 (and also thus, stationary relative to the vehicle). Camera 804 detects the relative movement of the viewed cylindrical member 614. During a rotation of the internal cylindrical member 614, unit 802 repeatedly captures images of the undersurface 616 at a cadence, and the processor in the unit 802 determines the rotation which has occurred based on the continually-detected changes in the angular images received from the camera. More specifically, using a first image as a reference, a second image reflects a new anglular orientation, and then using known methods, the rotation angle can be calculated. It should be noted that the use of the term "cadence" as used herein should not be construed as requiring a regular time interval in which images are acquired. Instead, the term is intended to require only that a series of acquisitions are taken according to any organized schedule.

To optimally capture the images, it is preferred that the camera lens arrangement 804 in the unit 802 have a focal length to accommodate the significant distance that exists from the unit 802 to the undersurface 616. Since the distance is relatively great, the focal length for the camera lens (of camera 804) must also be relatively great in order for the camera to properly focus.

Figure 9:
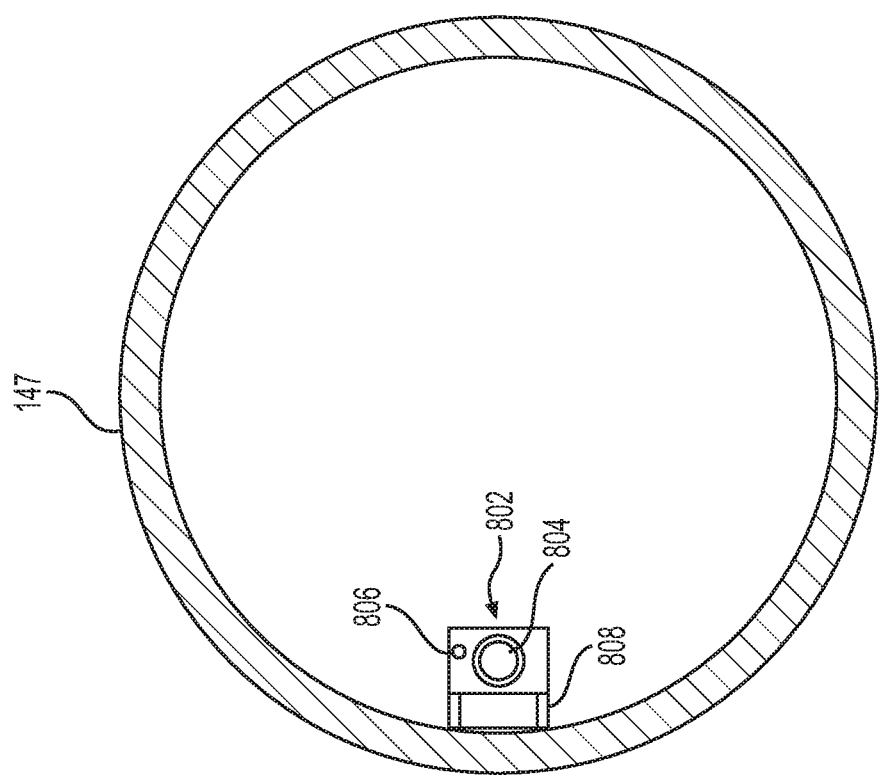
FIG. 9 shows a sectional view 9-9 taken as shown in FIG. 6.

FIG. 9 is a sectional view 9-9 taken as shown in FIG. 6, which shows the FIG. 8 rotational measurement unit embodiment 802 as it would appear looking down the inside of the cylinder 147.

Figure 10:
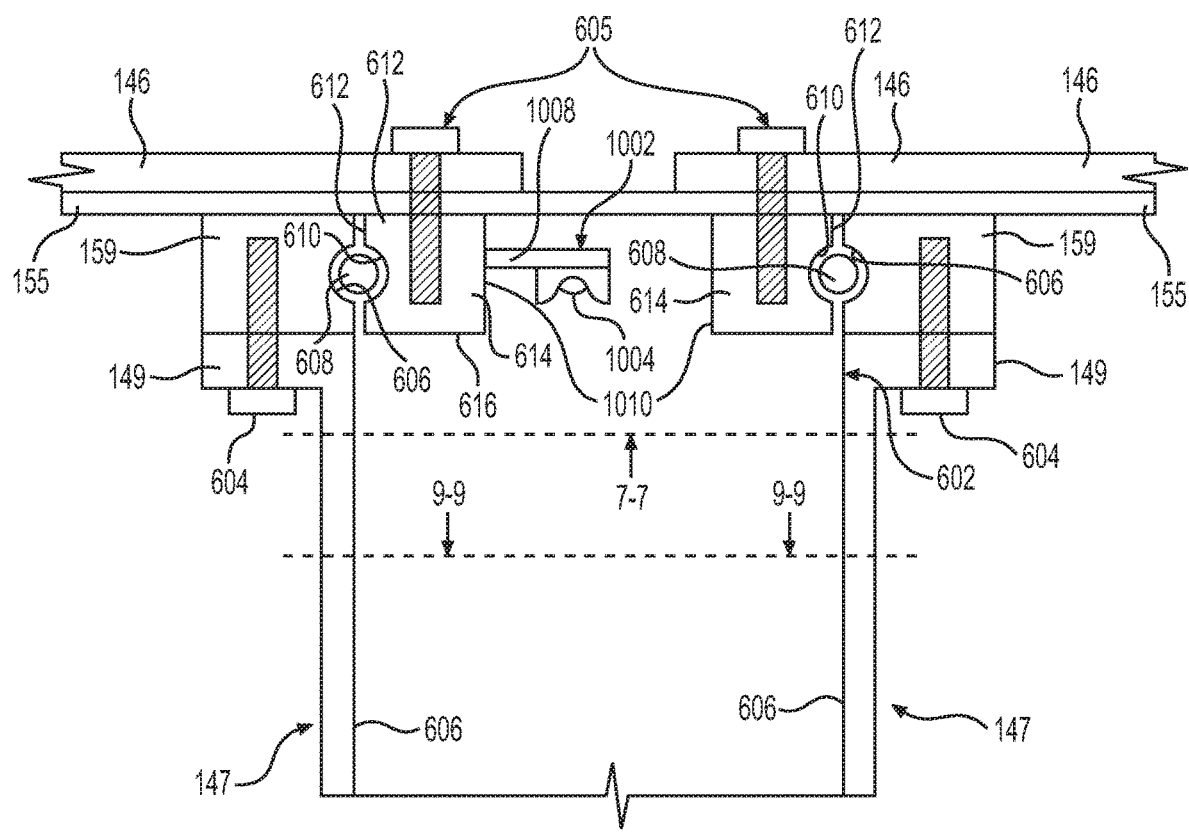
FIG. 10 shows a sectional view 10-10 taken as shown in FIG. 5 for a third exemplary embodiment.

The sectional view 10-10 (taken from FIG. 5) shown in FIG. 10 reveals a third rotational measurement embodiment. In this arrangement, a downwardly-facing rotation measuring unit 1002 is mounted on the inside surface 1010 of the internal cylindrical member 614 including a camera 1004 is mounted below a support structure 1008. Thus, the camera 1004 is supported from above, and is aimed downward in the cylinder 147. Although not shown in FIG. 10, it should be understood that the camera 1004 is adapted to be focused on a stationary structure located below which, when the camera 1004 rotates around in a circle defined during the turning of member 614, the unit 1002 is able to determine a rotation angle using the same processes discussed above regarding the FIG. 8 embodiment.

FIG. 11 shows a system block diagram 1100 for an embodiment including both translational measurement unit 402, and one of rotational measurement arrangements 602, 802, 1002. As can be seen in the figure, the communications component 410 of translational unit 402 communicates measurement information to an onboard position control system 1102 through a connection 1104. Connection 1104 can be either a wireless arrangement in embodiments, or a hard wired arrangement in other embodiments. The rotational measurement unit (one of units 602, 802, or 1002) is similarly connected into the onboard position control system 1102 via a connection 1106. Again here, connection 1106 can either be wireless or hard wired.

Information received into the onboard position control system can then be processed along with other information made available to the control system 1102 from other sources to determine the angular or translated positions of particular segments (e.g., segments 141, 142, 144, 145), and also determine an operating position for platform 112.

The position control system 1102 is for example a computer, microcontroller, microprocessor, or programmable logic controller (PLC) having a memory, including a non-transitory medium for storing software, and a processor for executing instructions of the software.

Figure 12:
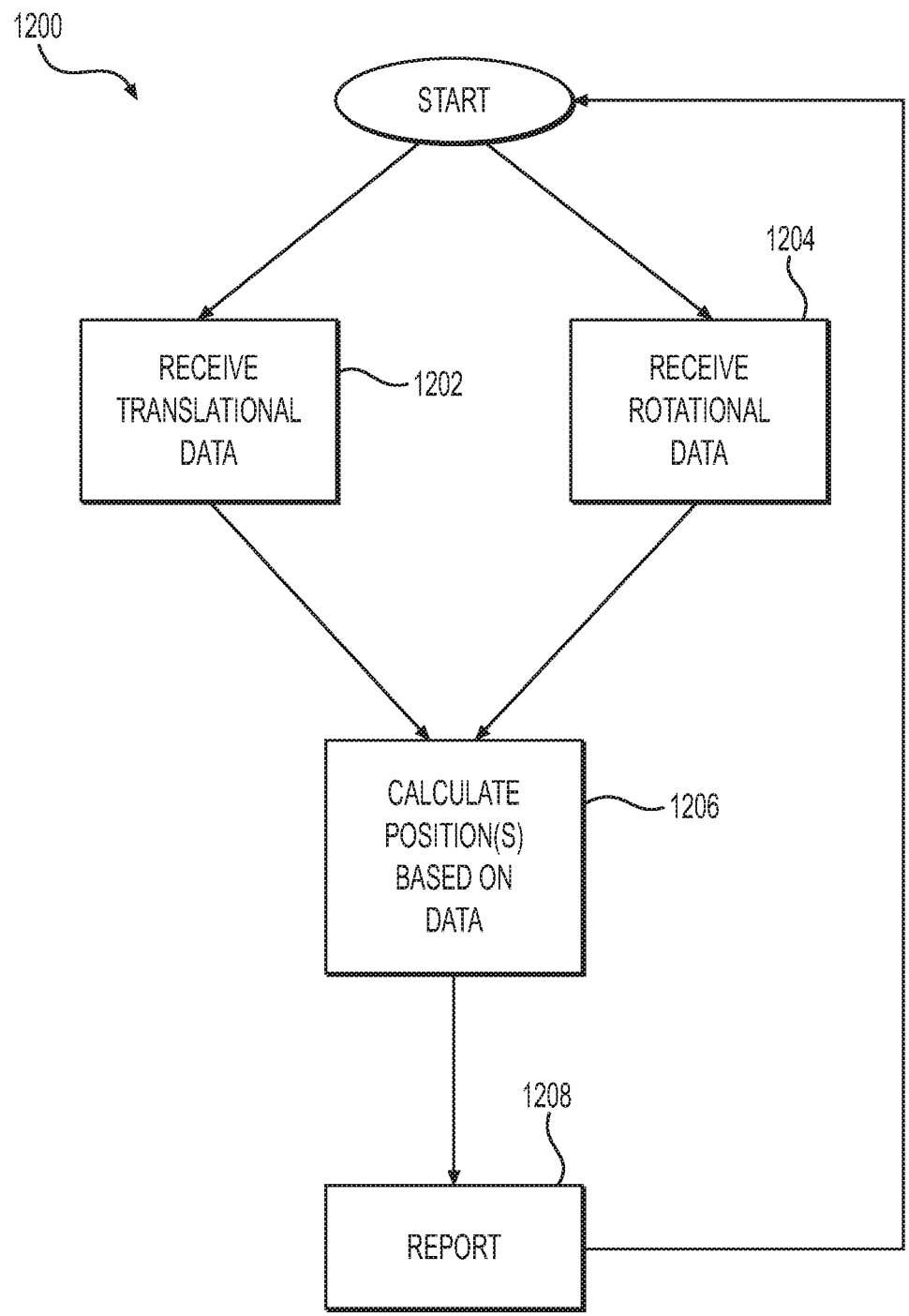
FIG. 12 shows a flow diagram for an embodiment for a process executed on a position monitoring system.

FIG. 12 is a flow diagram reflecting an embodiment for a process executed by the position monitoring system using the data received from the translational and rotational measurement units. After starting, the process involves the receipt by the onboard position control system 1102 of translational data from translational measurement unit 402, as well as rotational data from the rotational measurement unit (one or more of units 602, 802, and 1002). After receipt, in a step 1206, analysis is performed using the data received, as well as additional data, and position determinations are made. For example, information regarding: (i) the extension of member 145 as determined by translation measurement unit 402, and (ii) the rotation of turret 146 as measured by rotation measurement unit 602 could be received into the control system 1102 and contribute to the making of a determination of the position of the platform 112.

Numerous alternative arrangements regarding how the readings taken are processed are possible, and contemplated herein. For example, in some embodiments it may be desirable to transfer the processing of some of the image data received by the measurement units (e.g., units 402, 602, 802, and 1002) to the control system 1102 or elsewhere. Similarly, it may be desirable to execute some or all of the processes described as being executed on the control system 1102 locally on the measurement unit processors that are embedded in the measurement units.

It should be understood, that in other embodiments similar translational or rotational measurement units could be incorporated into other aspects of an aerial or other system to even further contribute in monitoring the position of platform 112 or any other device component for which knowing a current position is desired. For example, rotation measurement units (like units 402, 602, 802, and 1002) could also be located into the connection mechanisms at pivot points 202, 206, and at the pivot 170 between the top of member 144 and the platform 112, the added units providing even more data which could be used by the control system 1102 to calculate position.

And in simpler embodiments, only a single measurement unit could be used to measure either translation or rotation. Therefore, the scope of this disclosure should not be limited to any particular number or kind of measurement units employed unless otherwise specified in the claims.

Although embodiments of this disclosure have been described with reference to the illustrations in the attached drawing figures, it is noted that equivalents may be employed and substitutions made herein without departing from the scope hereof as recited in the claims.

Having thus described various embodiments, what is claimed as new and desired to be protected by Letters Patent includes the following:

1. A position detection system, the system comprising:
    a first member configured to be movable relative to a second member;
    a motion-sensing device on either the first or the second member, the motion-sensing device being oriented to receive image data relevant to motion of the first member relative to the second member; and
    a processing component configured to determine a position of one of the first and second members using the image data.

2. The system of claim 1 wherein the first member is translatable relative to the second member, and the processing component determines an extent of translation.

3. The system of claim 2 wherein the first member is in a telescopic relationship with the second member.

4. The system of claim 3 wherein the first member is translated in and out of the second member, the second member acting as a sleeve for the first member, the first member being configured to support a working platform.

5. The system of claim 4 wherein the motion-sensing device is located in a coaxial space existing between the first and second members and measures relative movement between the first and second members.

6. The system of claim 4 wherein the motion-sensing device is located at a sleeve end of the second member and aimed to obtain image data relating to the translation of the first member in and out of the second member.

7. The system of claim 2 wherein the first member rotates inside of the second member.

8. The system of claim 7 wherein the motion-sensing device is: (i) in a fixed relationship and rotates with the first member, and (ii) oriented to receive images from internal surfaces of the second member.

9. The system of claim 8 wherein the motion-sensing device includes a camera, the camera being suspended down from the first member and being oriented to receive images from the internal surfaces of the second member, the camera having a lens having a focal length corresponding to a distance from the camera to the internal surfaces of the second member.

10. The system of claim 7 wherein the motion-sensing device is mounted in fixed relation to the second member and aimed in a direction to receive images from a rotating surface of the first member.

11. The system of claim 10 wherein the motion-sensing device includes a camera, the camera having a lens, the lens having a focal length corresponding to a distance from the camera to a rotating surface of the second member.

12. The system of claim 7 wherein the motion-sensing device is: (i) in a fixed relationship and rotates with the first member, and (ii) oriented to receive images from a stationary surface a substantial distance from the first member.

13. The system of claim 7 wherein the motion-sensing device is a camera, and the camera: (i) is in a fixed relationship and rotates with the first member, (ii) is oriented to receive images from a stationary surface a substantial distance from the first member, and (iii) includes a lens having a focal length which is substantially the same as the distance from the first member.

14. The system of claim 7 wherein the camera captures images at a cadence and then processes the images using an embedded processor to calculate an arcuate distance traveled to determine rotational movement.

15. The system of claim 1 wherein the motion-sensing device is a camera configured with a lens having a focal length contemplating a distance from the camera to a surface to be imaged.

16. The system of claim 15 wherein the camera captures images at a cadence and then processes the images on an embedded processor to determine a distance the first member has translated relative to the second member.

17. The system of claim 15 wherein a light-emitting device is configured to direct light into the area of the surface to be imaged.

18. The system of claim 1 wherein the first member is rotatable relative to the second member, and the processing component is configured to determine an extent of rotation.

19. A movement monitoring system for an aerial device, the system comprising:
- a first member movable relative to a second member;
- a camera unit mounted on either the first or the second member, the camera unit being oriented to receive image data relevant to movement of the first member relative to the second member; and
- a communications device configured to: receive the image data from the camera unit, and (ii) send information regarding a relative movement of one of the first or second members to a positioning system for the aerial device.

20. A system comprising:
- a first image receiving and processing unit located on a first member, the unit being configured to measure the relative translation between the first member and a second member on an aerial device;
- a second image receiving and processing unit configured to measure rotation of a rotatable element on the device; and
- each of the first and second image receiving and processing units being configured to communicate image data to a position control system, the position control system being adapted to determine a position of an element of the aerial device using the image data.

* * * * *